United States Patent
Dudek et al.

(10) Patent No.: US 6,852,957 B2
(45) Date of Patent: Feb. 8, 2005

(54) BREADCRUMB PROCESSING LINE AND METHOD

(75) Inventors: Stephen Joseph Dudek, River Forest, IL (US); Ian Owen, Rockton, IL (US)

(73) Assignee: Kerry Group Services International, Ltd., County Kerry (IE)

( * ) Notice: Subject to any disclaimer, the term of this patent is extended or adjusted under 35 U.S.C. 154(b) by 28 days.

(21) Appl. No.: 10/185,543

(22) Filed: Jun. 28, 2002

(65) Prior Publication Data

US 2004/0000543 A1 Jan. 1, 2004

(51) Int. Cl.[7] .................................................. H05B 6/70
(52) U.S. Cl. ..................................... 219/655; 426/496
(58) Field of Search ................................ 219/655, 700, 219/771, 776, 725, 752–756, 762, 684, 698; 426/496, 497, 502, 518, 523; 99/357, 494, 510; 425/294, 363

(56) References Cited

U.S. PATENT DOCUMENTS

| | | |
|---|---|---|
| 277,792 A | 5/1883 | Schweitzer |
| 1,946,843 A | 2/1934 | Elliot |
| 2,454,370 A | 11/1948 | de Gaspe Beaubien |
| 3,133,818 A | 5/1964 | Gould et al. |
| 3,360,865 A | 1/1968 | Galle et al. |
| 3,445,239 A | 5/1969 | Viault, Jr. |
| 3,631,819 A | 1/1972 | Houchman |
| 4,218,480 A | 8/1980 | Dyson et al. |
| 4,344,975 A | 8/1982 | Seiler |
| 4,419,374 A | 12/1983 | Pei |
| 4,775,769 A | 10/1988 | Jones |
| 4,861,601 A | 8/1989 | Seneau |
| 4,938,127 A | 7/1990 | van Lengerich |
| 4,943,438 A | 7/1990 | Rosenthal |
| 5,079,012 A | 1/1992 | Lengerich et al. |
| 5,175,010 A | 12/1992 | Roig et al. |
| 5,277,924 A | 1/1994 | Padilla |
| 5,284,514 A * | 2/1994 | Griffiths ...................... 118/23 |
| 5,553,532 A | 9/1996 | de la Luz-Martinez et al. |
| 5,707,674 A | 1/1998 | Andrews |
| 5,906,764 A | 5/1999 | Suzuki et al. |
| 5,945,022 A | 8/1999 | Volpe et al. |
| 6,063,422 A * | 5/2000 | Ando et al. ................. 426/244 |
| 6,399,130 B2 | 6/2002 | Parker |

FOREIGN PATENT DOCUMENTS

| | | |
|---|---|---|
| EP | 0046159 | 2/1982 |
| EP | 0255261 | 2/1988 |
| EP | 0269358 | 6/1988 |
| EP | 1116440 | 1/2001 |
| JP | 58-134960 | 8/1983 |
| JP | 61-212267 | 9/1986 |
| JP | 06217725 | 8/1994 |
| JP | 08103235 | 4/1996 |
| JP | 08289752 | 5/1996 |
| JP | 8-332018 | 12/1996 |
| JP | 09154521 | 6/1997 |
| JP | 11127806 | 5/1999 |
| JP | 2000-270798 | 10/2000 |
| WO | WO-92/02150 | 2/1992 |
| WO | WO-95/17098 | 6/1995 |

* cited by examiner

Primary Examiner—Quang T. Van
(74) Attorney, Agent, or Firm—James A. Wanner

(57) ABSTRACT

The present invention is directed toward a breadcrumb continuous processing line and process capable of producing multiple types of breadcrumbs, namely American style breadcrumbs, Japanese style breadcrumbs and cracker meal crumbs. Each type of bread crumbs has different characteristics including the thickness of the dough sheet the different baking requirements. The breadcrumb processing line, and the oven therein is capable of being adjusted to process of the bread dough sheet in the manner necessary to produce the type of breadcrumb desired at any given time on a single processing line.

16 Claims, 3 Drawing Sheets

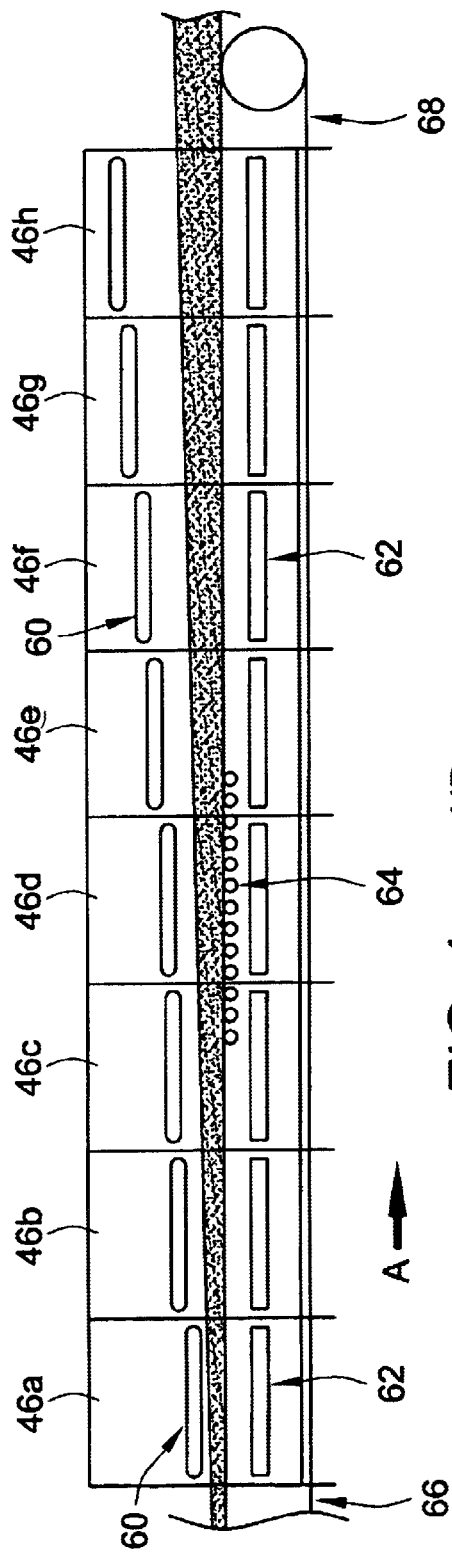

BREADCRUMB PROCESSING LINE AND METHOD

FIELD OF THE INVENTION

The present invention is directed to a method and apparatus for producing more than one type of breadcrumb (such as American breadcrumbs, Japanese breadcrumbs and/or cracker meal crumbs) on a single production line selectively utilizing more than one baking method, such as radio frequency baking and convection baking.

BACKGROUND OF THE INVENTION

There are various types of breadcrumbs which have been requested by various consumers. These include American breadcrumbs that include a crust for both texture and coloring, Japanese breadcrumbs that have no crust and generally have a high rise during baking, and cracker meal crumbs which are more dense and baked to a more rigid consistency.

In the past it has been necessary for a manufacturer to have separate production lines for the various types of breadcrumbs requiring a duplication in invested capital and leading to idle time on one line or the other when there is a lack of demand for a particular type of breadcrumb.

Part of this is because American breadcrumbs are best produced by convection baking to help form the crust and require less baking time than Japanese breadcrumbs. Japanese breadcrumbs are not well suited to convection baking and are commonly baked by conduction heating or microwave heating to prevent the formation of crust. Furthermore, Japanese breadcrumbs require approximately double the oven time of American breadcrumbs.

More specifically, American breadcrumbs are made either by loaves or by sheeting, slitting and baking the dough followed by cooling, grinding, and drying the baked product. A golden-colored crust contributes color to the breadcrumb. The crust is obtained either by the conventional baking process itself or by toasting the bread in the dryer. Crackermeal is made from a high density dough that is sheeted and baked, then ground, dried and milled. The dough generally has a pale crust, resulting from a relative quick conventional baking process, which is carried through into the resulting crumb.

Previously in producing Japanese-style breadcrumbs, a so-called "bucket" is utilized, which forces the dough to rise essentially vertically, rather than horizontally and laterally, so as to provide a very high rise in the vertical direction with an elongated open-cell structure. The dough, after being baked in a manner to reduce the amount of crust, is then cooled to set their grain structure, and then ground and dried. In this method, conduction heating of the dough releases moisture from the dough during baking. This moisture condenses and may combine with the baking dough, resulting in hygienic and other concerns.

Alternatively for Japanese bread crumbs, the bread dough can be mixed and structured in an extruder, a continuous mixer, or a batch mixer. The resulting dough is formed to provide an elongated cell structure and then baked using a microwave oven to provide a baked product having no crust. The baked dough pieces are cooled to set the grain structure and ground into crumb. In both cases, the result is a distinctive low density crumb with no crust content. However, in the context of continuous throughput ovens, penetration of the microwaves into the dough is limited. Also, containment of the microwaves is difficult, because these ovens must have openings through which product enters and leaves the oven.

Beabien U.S. Pat. No. 2,454,370 (1948) is an early teaching of a conveyor belt system with an electronic baking oven having various types of heating including convection and heating via a high-frequency dielectric electrode to reduce the baking time, reduce oven temperatures and increase humidity dispersal in baking dough. This patent does not teach using the combination of radio frequency baking along with the convection baking with the ability to select one or more of these baking capabilities to make various types of breadcrumbs on a single production line.

Suzuki U.S. Pat. No. 5,906,764 teaches a Japanese breadcrumb production line having two conveyors running at two different speeds to stretch the dough sheet to obtain elongated cells, and then subjecting the stretched dough to a combined baking process in a single oven having both microwave and convection baking. While such a production line could possibly be used to produce both American breadcrumb and Japanese breadcrumb on the same production line, Suzuki does not teach this concept either alone or with the combined use of radio frequency baking with convection baking of dough sheets.

OBJECTS OF THE INVENTION

The present invention is directed to a process and production line for producing more than one type breadcrumb (particularly a combination of American breadcrumbs, Japanese breadcrumbs and/or cracker meal crumbs) on a single production line selectively utilizing more than one baking method, such as radio frequency baking and convection baking. This provides the advantage of requiring only investment capital for one breadcrumb production plant rather than investing in multiple plant sites. This also permits more continuous use of the production line since, if demand for one type of bread crumb diminishes, another type of bread crumb on the same line. Furthermore, in practicing the present invention higher capacity is obtainable from the single plant breadcrumb producing line since it is possible even for American breadcrumbs or cracker meal crumbs to use more than one baking capability. Thus a single production line results in producing multiple styles of breadcrumbs from a single production line with higher volume capability.

For purposes of this patent specification and claims the term "breadcrumb(s)" means not only American breadcrumbs and Japanese breadcrumbs wherein each have its own traditional bread texture and consistency, but also includes cracker meal crumbs which are a flour based product having a texture and consistency denser and more rigid than that normally associated with breadcrumbs of either the Japanese or American style. It is also noted that all three styles of breadcrumbs have different initial dough ingredients and consistency, each having its own ideal dough sheet height, and require different processing. It is also noted that both the American breadcrumb and cracker meal crumb generally have a cellular structure which is generally spherical in nature, however, Japanese breadcrumbs preferably have a cell structure which is elongated in a single axis but not elongated in the other two axis perpendicular to the single axis.

Also for purposes of this patent specification and claims, the term "radio frequency" dielectric baking, sometimes referred to herein as "RF" baking, is distinguished from the term "microwave" baking, consistent with the terms as generally used in the food baking arts, with RF having radio wave frequencies in the range of 1 MHz to 100 MHz and microwave baking commonly having radio wave frequencies of either 915 MHz or 2.45 GHz. Furthermore, RF baking to be effective requires electrodes on opposite sides of the object to be baked and with the electrodes relatively closely spaced from the object surfaces. Microwave baking does not require electrodes spaced on opposite sides of the object to be baked or in close proximity thereto, but because of its frequency does require that the oven enclosure be moderately well sealed to prevent the adverse effects of escaping high frequency waves. Containment of RF radiation can be achieved in a continuous throughput oven having relatively large openings (as compared with continuous throughput microwave ovens). A further advantage of RF heating is that the RF waves alternate less rapidly and thus penetrate more thoroughly and more evenly into the dough than microwaves, especially as thicker dough sheets are baked.

In this invention, a single continuous breadcrumb production line has an oven with a combination of RF baking capability and conventional or convection baking capability for making multiple types of breadcrumbs. Instead of loaves, a flat sheet of dough is used to make American and cracker meal crumbs. For the Japanese breadcrumb high rise dough, a dough with a higher yeast content is used to form a thin dough sheet which is undulated to make Japanese-style breadcrumbs. The height of the American breadcrumb dough sheet is several times thicker than the Japanese breadcrumb dough sheet but approximates the height of the pre-oven Japanese breadcrumb dough after the undulations are formed.

To produce Japanese-style breadcrumbs, the sheeted dough is moved from a moving belt at a first speed to a second belt at a lower speed, so that the dough bunches up on itself, somewhat in a undulating manner, in order to provide the high rise required by this type of crumb. By adjusting sheet thickness and conveyor speed, differentials in the structure and texture of the resulting baked dough can be varied. To prevent a crust from being formed, RF baking primarily heats the dough for the Japanese breadcrumb.

When this undulation procedure is used for the manufacture of Japanese breadcrumbs, the configuration of the dough on the baking conveyor, which is running slower than the feed conveyor, is such that adjacent regions of the dough that stand up from the conveyor contact one another, whereby the dough constrains itself in the longitudinal direction, that is the direction of movement of the conveyor, during baking. The adjacent upstanding regions of the dough may be in contact prior to baking or may be close enough together to come into contact as the dough expands during baking. In either case, the result is that the dough can expand upwardly or vertically away from the conveyor, but is constrained at least to some degree against expansion in the longitudinal and transverse directions, thereby maintaining the elongated cell structure desired for Japanese breadcrumbs with the cellular elongation being primarily in a single direction. When making the American breadcrumbs or cracker meal crumbs, the undulation procedure is not used, and instead a conventional convection oven capability, with or without RF heating, is primarily used and heated to different temperatures for the American breadcrumbs and the cracker meal crumbs.

It is an object of the present invention to have a process for producing various styles of breadcrumbs on a single breadcrumb production line having a transfer line for transferring dough from a dispensing apparatus through an oven, the oven having at least radio frequency dielectric baking capability and a convection baking capability (or at least multiple baking capabilities), wherein the process includes the steps of: 1) selecting a type breadcrumb to be produced between at least two of the options of American breadcrumb, Japanese breadcrumb and cracker meal crumb; 2) dispensing a dough sheet having the correct components and consistency for the type breadcrumb to be produced on a conveyor with the dough sheet having a height appropriate for the type breadcrumb to be produced; and 3) transporting the bread dough sheet through the oven with either or both of the radio frequency and convection baking capabilities being selected to bake the bread dough sheet depending on the type breadcrumb selected.

Another object of the present invention is to have an oven for radio frequency baking food products which are transported through the oven on a conveyor system with the food products increasing in height as heat is applied to the food products, the oven having an inlet and an outlet permitting substantially horizontal movement of the conveyor through the oven, the oven further having a lower electrode which is in close proximity to the lower surface of the food product and an upper electrode which is vertically spaced from the lower electrode and in close proximity to the upper of the food product, the vertical spacing between the lower and upper electrodes being less near the oven inlet and being greater near the oven outlet.

Yet another object of the present invention is to have a process for bread crumb manufacture comprising preparing and sheeting the dough, disposing the dough sheet on a conveyor and deforming the dough sheet to form the dough into an undulating configuration, baking the dough by conveying the same through an oven, and converting the baked dough into bread crumbs.

BRIEF DESCRIPTION OF THE DRAWINGS

The present invention will be more fully understood from the detailed description given below and from the accompanying drawings, which are presented by way of illustration only, are not drawn to scale, and do not in any way limit the present invention.

FIG. 3 is a schematic illustration of an oven having radio frequency capability with the radio frequency electrodes being adjustably vertically spaced.

BEST MODE OF PRACTICING THE INVENTION

Figure 1:
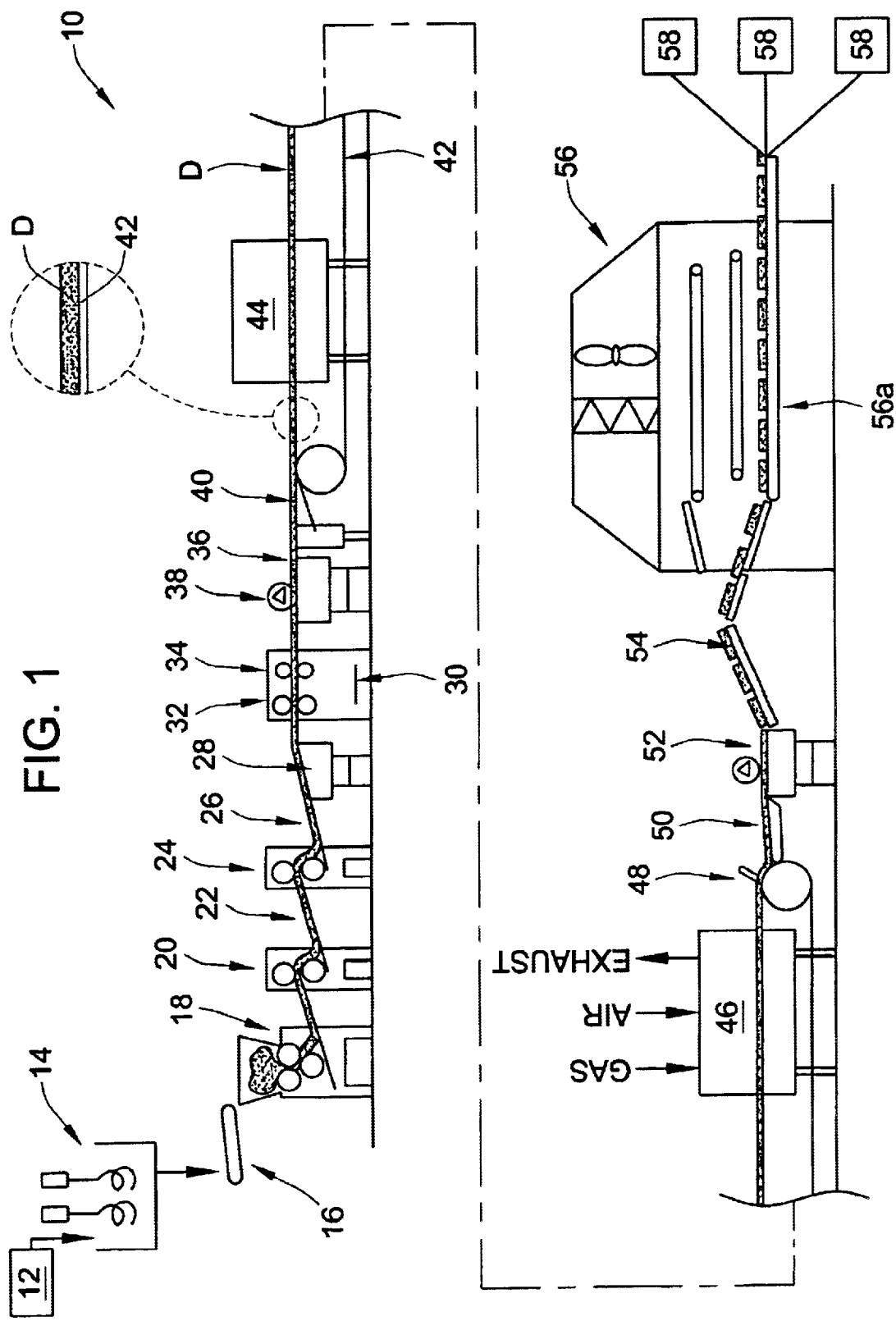
FIG. 1 is a schematic illustration of a production line constructed and arranged according to the present invention for the production of American breadcrumbs or for cracker crumbs.

A continuous breadcrumb production line 10 is illustrated in FIG. 1. The production line 10 starts with a continuous mixing apparatus which includes a mixer 12 and a kneader 14. A mixture of flour, salt, and other additives is provided into which color, yeast, and water are fed into the mixer 12. The resulting combination of ingredients is fed from the mixer 12 into the kneader 14. Fines recovered from later stages of the line can also be returned to the kneader 14. The mixer is capable of producing the different doughs for, respectively, American breadcrumbs, cracker meal crumbs, and Japanese breadcrumbs with a reduced (compared to conventional processing) water content. Reduced water content in the dough reduces the energy required for drying at later stages of the process.

Figure 2:
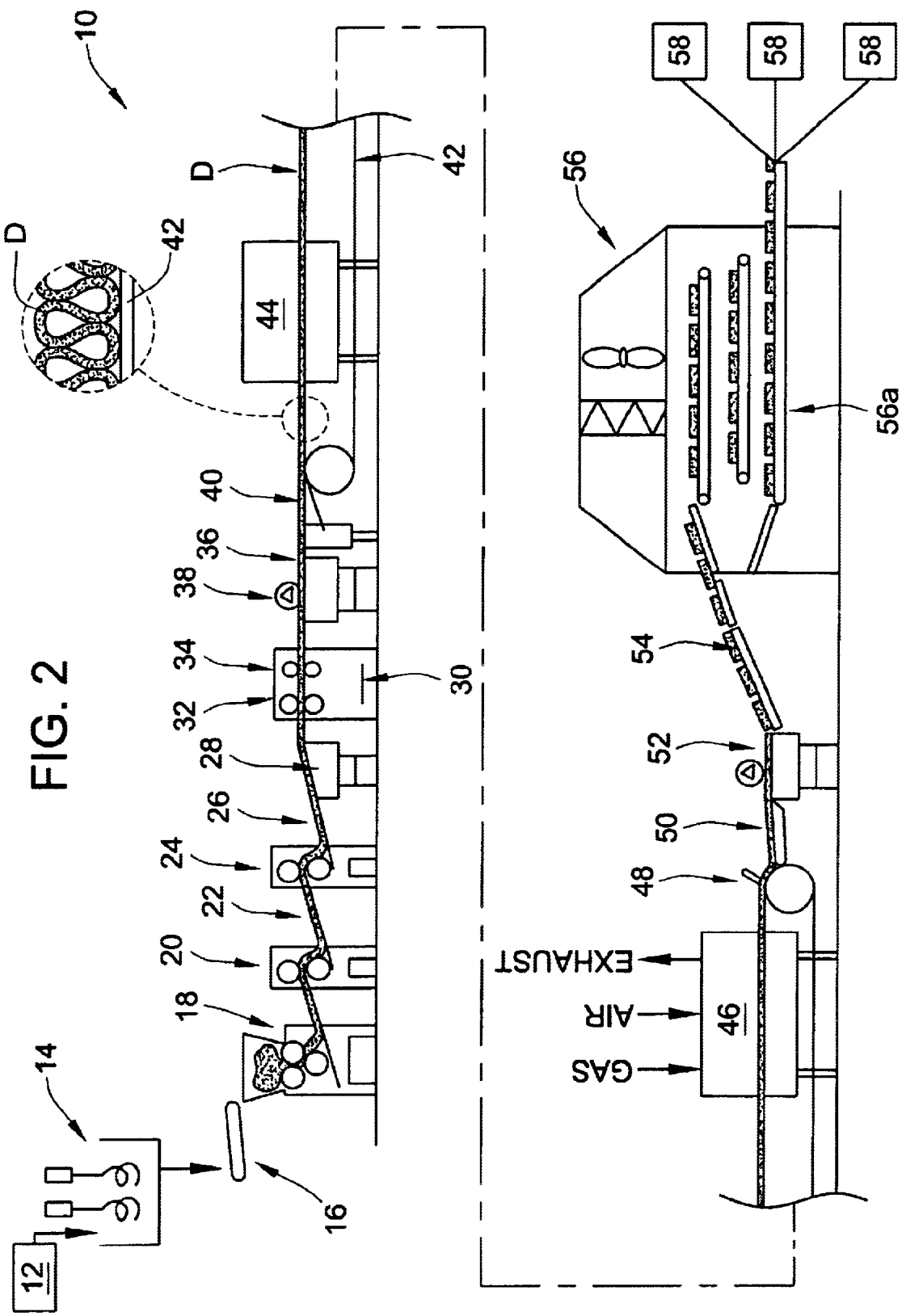
FIG. 2 is a schematic illustration of the same production line shown in FIG. 1, arranged for the production of Japanese breadcrumbs.

In both FIG. 1 and FIG. 2, the dough output from kneader 14 is fed by high level conveyor 16 to a three roll sheeter 18. The three roll sheeter 18 transforms the dough mass into a dough sheet D. An integral conveyor transports the dough sheet to gauge roll machines 20 and 24 separated by a transfer conveyor 22. Different conditions then apply for the three different types of crumb to be made.

For American breadcrumb production (illustrated in FIG. 1), the gauge roll machines 20 and 24 roll the sheet down to final thickness for baking. A relaxation conveyor 28 transports the resulting dough sheet D at a line speed substantially matching that of the rollers to a twin roll rotary docker 30 containing two different docking rollers 32 and 34. The docking rollers 32 have a dense pattern of small pins to dock the top surface of the sheet to prevent blistering and darkening (i.e. burning of the surface when blisters are formed). The other docking rollers 34 contain toothed wheels designed for pinning through the dough sheet. The dough sheet D is transferred to a cutter 36 having pastry cutting knives 38 to split the sheet into three longitudinal strips and a rotary knife or guillotine to cut the sheet transversely into spaced sections. This separation eases feeding the baked dough to three separate grinding mills at a later stage in the process. A swivel panner 40 transfers the dough pieces onto an oven belt or conveyor 42 running at generally the same speed as the conveyor 38.

When breadcrumb production line 10 of the FIG. 1 is used for making cracker meal crumbs, the dough sheet D is reduced down to final thickness by application of the gauging rollers 20 and 22. The relaxation conveyor 28 transports the dough sheet at substantially the same line speed to the rotary docker 30. The sheet is transferred to the cutter 36 and cut longitudinally and transversely as described above for American breadcrumbs to ease feeding into separate mills at the grinding stage after baking in the oven. The cracker meal dough pieces are then conveyed through the oven 46 (shown in greater detail in FIG. 3) by conveyor 42.

FIG. 2 illustrates the same line seen in FIG. 1, but as it is used for Japanese breadcrumb production. The components of both lines are the same. In Japanese breadcrumb production, the dough sheet D is rolled to reduce its thickness by the first gauge roller 20 and then is rolled to approximately 6 mm thickness by the second gauge roller 24. During these gauging operations, transfer conveyors 22 and 26 are run slightly faster than the surface speeds of the gauging rollers 20 and 24 to encourage an elongated cell structure in the dough sheet D.

The relaxation conveyor 28 is slowed relative to the transfer conveyor 26. The relaxation conveyor 28 may for instance be run about ⅓ to ½ as fast as the transfer conveyor 26. Due to the speed differential, when the sheet of dough D at 6 mm in height is conveyed from transfer conveyor 26 onto relaxation conveyor 28, a ripple R is produced in the form of closely spaced undulations. As the dough rises the undulation height reaches approximately 25 mm. This ripple R is conveyed at the same slower speed through the rotary docker 30 which is not activated. The rippled dough sheet is transferred to conveyor 38 containing pastry cutting knives of panner 36 to split the sheet into three strips. This separation is to ease feed three separate mills at the later grinding stage of the process. The swivel conveyor 40 transfers the dough pieces to oven belt or conveyor 42. All subsequent conveyors are run at the same speed to avoid unraveling the ripple formation R.

The dough D is conveyed through an optional resting section or proofer 44 and then to oven 46 by the conveyor 42. In accordance with the present invention, the same oven 46 is used for production of all three types of breadcrumb. The oven conveyor 42 preferably consists of a stainless steel mesh belt, in order to avoid any discoloration from oxidation of the belt and to minimize energy losses during the RF baking.

The oven 46 used in the process of this invention is based on conventional indirect gas-fired convection ovens. However, the oven of this invention additionally includes a facility for baking with radio frequency (RF) electromagnetic waves. The RF dielectric is generally used at frequencies between 10 and 100 MHz. 40.68 MHz has been selected to be the most convenient setting as it is one of the federally established industrial scientific and medical (ISM) bands. Generally, RF baking is accomplished by providing paired electrodes (explained later) both below and above the conveyor belt 42 within the oven chamber. Typically, one of the electrodes is grounded (normally the lower electrode) while the necessary high tension RF signal is applied to the other electrode (normally the upper electrode).

Different combinations of convection and RF heating or baking are utilized in baking the different types of breadcrumbs. For Japanese breadcrumb manufacture, baking is predominantly by RF, in order to avoid formation of unwanted pale crust on the exterior of the dough. For American breadcrumb manufacture, a high oven temperature us used in order to form a crust and provide color.

For all three breadcrumb types, a stripping blade 48 at the delivery end of the oven 46 peels the baked product off the oven conveyor 42 and a stripping conveyor 50 transports it to handling conveyors. Slitting knives of cutter 52 are fitted to conveyor 50, aligned with the cuts made by the rotary docker 30 before baking. This re-separates the sheet into three separate streams if baking has caused them to rejoin. Due to this alignment with cuts made before baking, damage to the structure of the baked product is reduced.

The three baked dough sheet sections are transported up an incline conveyor 54 to a cooler 56. Cooler 56 is a multipass cooler with a chilled air recirculation system in which the product pieces are turned at each end. When in American crumb or cracker meal crumb mode, the cooling system may be shut down. The cooling conveyor 56a is run at full speed in a single pass mode (Shown in FIG. 1) with the incline conveyor 54 in its lower position to provide the minimum residence time for these products. By keeping these products hot, the energy required in the drying stage is minimized. When Japanese breadcrumbs are desired, the incline conveyor 54 is in its upper position and the cooler 56 operates it its multipass mode to lengthen the cooling time.

At the end of the cooler 56, the product sheets are separated into three distinct streams that are fed to three or more separate grinding mills 58. The size and geometry of the mills 58 have an effect on crumb sizing. Accordingly, the throughput of the manufacturing line will determine what number of mills will be required.

FIG. 3 shows a preferred embodiment of the oven 46 which provides both RF baking and convection baking of the dough sheet D passing through the over 46 on the oven conveyor or belt 42. The oven belt 42 passes through the oven 46 in the direction of the arrow A from the left to the right of the oven. The oven 46 is formed of 8 zones, 46a–46h, each 4 meters in length. All zones except 46c, which is a resting zone, are fitted with upper and lower plenums 60 and 62 (only two pair being numbered to simplify the figure) which are shown more specifically in FIG. 4. Zone 46c may be made longer than 4 meters if it is desirable to have an increased rest or rise time since the conveyor belt speed will be determined by the amount of heating time desired in the zones other than 46c.

The upper plenums 60 in zones 46a, 46b, 46g and 46h also act as an upper electrodes for RF heating. The stainless steel conveyor belt 42 is supported by 4 mm diameter aluminum coated steel rods 64 bent in the shape of a chevron with the arrow of the chevron pointed toward the exit end of the oven 46. For simplicity sake, the rods 64 are only shown in zone 46d but obviously extend the whole length of the oven 46 to support the conveyor belt 42. These rods 64 also act as the negative electrode for the RF heating in those zones where RF heating is applied, namely 46a, b, g and h. The lower plenums 62 are spaced in between the forward and return portions of the conveyor belt 42 but below the rods 64. The upper and lower plenum 60 and 62 direct forced air convection gas heated hot air to the upper and bottom surfaces respectively of the dough sheet D riding on the conveyor 42. The upper plenums 60a–h are located substantially parallel to the lower plenums 62a–h. The upper plenums 60a, b, g and h also act as the positive electrodes for the RF heating. It is noted that there is no RF heating in oven zones 46c–f. For all breadcrumb types zone 46c is a resting or rising zone and when making Japanese breadcrumbs the plenums in zones 46d, e and f are deactivated so that these three zones also act as rising zones. It is desirable that the upper plenums 60a, b, g and h that also act as the positive RF electrodes are in very close proximity (approximately 20 mm) to the upper surface of the dough sheet D. As the dough sheet D is baked forming the baked bread, the dough sheet D, for American breadcrumbs and even more so for Japanese breadcrumbs, expands in height from the oven inlet 66 at the left end of the oven as it passes toward the oven outlet 68 at the right end of the oven. Because of the increase in height of the dough sheet D as heat is applied, and as the dough rises, in order to maintain the desired 20 mm spacing between the upper electrodes 60a, b, g and h and the top surface of the dough sheet D, it is necessary for the upper plenums 60 to have increased vertical spacing from the conveyor 42 as the conveyor moves from the left to right. This is shown in FIG. 3. For this reasons the upper plenums 60a–h, and particularly those plenums where RF heating is applied, are vertically adjustably mounted (by a specific means not shown) to obtain the increased vertical spacing. While the upper plenums 60 are illustrated in FIG. 3 as parallel to the conveyor 42 the upper plenums 60 preferably are slightly tilted upwardly (at an x degree angle) from left to right as shown in FIG. 4 to further adjust the spacing between the upper plenums and the upper surface of the dough sheet D as the dough sheet D increases in height by the application of heat and dough rising.

There is another advantage to the adjustable mounting of the upper plenums 60, and that is that the varying types of dough sheets D entering the oven 46 (as can be seen from the charts in the examples below) are of different heights depending on the type of dough being baked. If for a particular type of breadcrumb (for instance either American or cracker meal) it is decided to not apply any RF baking, the upper plenums 60 can be raised so as to not interfere with the passage of the dough sheet D because these plenums are not acting as RF electrodes and the 20 mm spacing is not critical. Thus the vertical spacing is adjustable for both the type of dough and for the increasing height of the dough sheet D as heat is applied in order to maintain the desired spacing, preferably 20 mm. Since a full size oven 46 is approximately 32 meters in length is used in the preferred production line, this adjustable mounting feature and the increased spacing is extremely desirable and is best obtained by dividing the plenums into multiple sections, with eight zones being shown in FIG. 3 for illustration purposes.

FIG. 4 shows one pair of plenums 60 and 62 and their relationship to the conveyor 42 and chevron shaped rods 64. A conventional indirect gas fired heater (not shown) is used to feed hot air to both the upper and lower plenums. The upper surface of the lower plenum 62 and the lower surface of the upper plenum 60 have multiple perforations to allow the hot air to be directed to the lower and upper surfaces respectively of the dough sheet D as sheet D passes on the conveyor 42. It is noted that the forced fed hot air is heated by a heat exchanger so that no gas fumes are passed into the plenums. These plenums are approximately 3.8 meters long with one set of plenums in each oven zones 46a–h, except zone 46c. The upper plenum is also provided with an RF feed so that the upper plenum also acts as the positive RF electrode. The RF feed is only used in oven zones 46a, b, g and h as explained above. FIG. 4 also shows in larger scale the support rods 64 used to support the belt of conveyor 42 with the rods 64 also acting as the negative RF electrode, again in zones 46a, b, g and h.

EXAMPLES OF THE BREAD CRUMB PROCESS

1. American Breadcrumbs

| | |
|---|---|
| Mix time | 5 to 8 minutes |
| Extrusion thickness (approx.) | 25 mm |
| Belt 42 speed | 1.7 meters/min |
| Maximum time in contact with RF (approx.) | 9½ minutes |
| Convection baking time (approx.) | 20 minutes |
| Oven inlet height of dough sheet (approx.) | 25 mm |
| Oven outlet height of dough sheet (approx.) | 45 to 55 mm |

The dough is prepared from wheat flour, a low percentage of yeast, water and other ingredients and mixed for 8 minutes. The dough is then extruded in a sheet approximately 25 mm in thickness. In the procedure known as docking, the roller 42 (configure like a rolling pin with spikes sticking out) puts small holes in the dough sheet to release gases and minimize undesirable blistering during baking. The dough sheet is also pinned clear through by roller 44. The sheet is carried on belt 42 into the oven 46 having a radio frequency capability operating at 40 MHz in the first section of oven, where it may be pre-baked by RF if desired. As the dough passes through the first section, and then passes into the remainder of the oven 46, the dough is convection baked at 400° F. for approximately 20 minutes. RF baking is optional in the first section while convection baking is taking place. The RF baking shortens the residence time in the oven 46 and also is less expensive that forced air convection baking. After baking and without substantial cooling, the baked dough is fed into a several shredders or conical mills, having coarse screens, where the American breadcrumb is ground. Finally, the ground American breadcrumbs are dried in a fluidized bed dryer and then packaged.

2. Japanese Breadcrumbs

| | |
|---|---|
| Mix time | 8 to 12 minutes |
| Extrusion thickness (approx.) | 6 mm |
| Belt 42 speed | .85 meters/min |
| Maximum time in contact with RF | 19 minutes |
| Convection baking time (approx.) | 0 minutes |
| Oven inlet height of dough sheet (approx.) | 25 mm |
| Oven outlet height of dough sheet (approx.) | 75 mm |

The dough is prepared from wheat flour, a higher percentage of yeast, water and other ingredients, and mixed for 12 minutes. The dough is then extruded in a sheet approximately 6 mm in thickness. The sheet is transferred from conveyor 26 to the relaxation conveyor 28 moving 30–50% of the speed conveyor 26. This results in rippling the sheet of dough forming undulations which reach approximately 25 mm in height as the dough rises in the vertical direction. The rippled dough sheet is carried on belt 42 into the oven 46 operating with radio frequency capability at 40 MHz, where it is baked for 40 minutes where no convection baking takes place. After baking, the "bread" is cooled for 2 hours, and then is fed into multiple shredders or conical mills, having fine screens, where the Japanese breadcrumb is ground. Finally, the ground Japanese-style breadcrumbs are dried in a fluidized bed dryer and then packaged.

3. Cracker Meal Crumbs

| | |
|---|---|
| Mix time | 5 minutes |
| Extrusion thickness (approx.) | 8 mm |
| Belt 42 speed | 8 ½ meters/min |
| Maximum time in contact with RF | 2 minutes |
| Convection baking time (approx.) | 4 minutes |
| Oven inlet height of dough sheet (approx.) | 8 mm |
| Oven outlet height of dough sheet (approx.) | 10 mm |

The dough is prepared from wheat flour, yeast (optional), water and other ingredients, and mixed for 5 minutes. The dough is then extruded in a sheet approximately 8 mm in thickness. The sheet is carried on belt 42 into oven 46 where the dough is quickly baked using convection heating of forced air at 500° F. and an optional radio frequency capability at 400 MHz to bake the dough for 4 minutes. After baking and without cooling, the dough is fed into multiple shredders, conical mills or hammer mills, having medium screens, where the cracker meal crumb is ground. Finally, the ground cracker meal crumbs are dried in a fluidized bed dryer and then packaged. The cracker meal may be blended with other ingredients, such as flavorings and preservatives, prior to packaging.

The above description and examples are representative of the best known modes of practicing the invention, but are not intended to be limiting as to the invention and are not intended to describe all possible methods of practicing the invention. What is claimed is as follows.

We claim:

1. A process for producing various types of bread crumbs on a single bread crumb production line having a transfer line for transferring dough from a dispensing apparatus through an oven, said oven having at least radio frequency induction baking capability and convection baking capability, said process comprising:
   a) selecting a type of bread crumb to be produced between at least two of American bread crumb, Japanese bread crumb and cracker meal crumb;
   b) dispensing a dough sheet having the correct components and consistency for the type of bread crumb to be produced on to said conveyor, said dough sheet having a height appropriate for the type of bread crumb to be produced; and
   c) transporting said bread dough sheet through said multi-stage oven with at least one of said radio frequency and convection baking capabilities being selected to bake the bread dough sheet depending on the type of bread crumb selected.

2. The process of claim 1 wherein said transfer line also includes a cooling stage located after said multi-stage oven, which cooling stage can be activated or deactivated depending on the type of bread crumb to be produced.

3. The process of claim 2 wherein said cooling state has a multipass and a single pass capability, said multipass capability being activated when the Japanese bread crumb type is selected, and said single capability being activated when the American bread crumb type and cracker meal crumb are selected.

4. The process of claim 1 wherein said transfer line also includes a dough sheet undulation stage prior to said oven, selecting to activate or deactivate said undulation stage for the dough sheet depending on the type of bread crumb selected in step a).

5. The process of claim 4 wherein the dough sheet passes through said oven at a faster speed when said undulation stage is deactivated and passes through said oven at a slower speed when said undulation stage is activated.

6. The process of claim 1 wherein said transfer line further includes a milling stage including at least one milling station located downstream of said oven, and selecting a milling process for said milling station depending on the type of bread crumb to be produced.

7. The process of claim 1 wherein said transfer line dispenses the dough sheet at more than one height with the height being established by the type of bread crumb selected.

8. A process for producing various types of bread crumbs on a single bread crumb production line having a transfer line for transferring dough from a dispensing apparatus through a multi-stage oven, said oven having multiple baking capabilities selected from the group consisting of radio frequency baking, microwave baking, radiant heat baking and convection baking, said process comprising:
   a) selecting a type of bread crumb to be produced between at least two of American bread crumb, Japanese bread crumb and cracker meal crumb;
   b) dispensing a dough sheet having the correct components and consistency for the type of bread crumb to be produced on to said conveyor, said dough sheet having a height appropriate for the type of bread crumb to be produced; and
   c) transporting said dough sheet through said oven with at least one of said baking capabilities being selected to bake the bread dough sheet depending on the type of bread crumb selected.

9. An oven for radio frequency baking food products which are transported through said oven on a conveyor system with the food products increasing in height as heat is applied to the food products, said oven having an inlet and an outlet permitting substantially horizontal movement of said conveyor through said oven, said oven further having a lower electrode which is in close proximity to the lower surface of the food product and an upper electrode which is vertically spaced from said lower electrode and in close proximity to the upper of the food product, said vertical spacing between said lower and upper electrodes being less near said oven inlet and being greater near said oven outlet.

10. The oven of claim 9 wherein each of said lower and upper electrodes consist of multiple sections with said sections being generally horizontally spaced along the path of said conveyor with said sections of said upper electrode being parallel to said sections of said lower electrode and said vertical spacing between said parallel sections of said electrodes increasing along the path of said conveyor.

11. The oven of claim 9 wherein at least said upper electrode is vertically adjustably mounted so that said vertical spacing between said lower and upper electrodes may be adjusted to accommodate the height of the food product being baked.

12. A process for bread crumb manufacture comprising preparing and sheeting dough, disposing a dough sheet on a conveyor system and deforming the dough sheet to form the dough into an undulating configuration, baking the dough by conveying the same through an oven, and converting the baked dough into bread crumbs.

13. The process of clam 12 wherein said conveyor system has a first conveyor and a second conveyor operating at two different speeds with said first conveyor operating at a speed greater than the speed of said second conveyor, said undulation configuration being obtained by the transfer of the dough sheet from said first conveyor to said second conveyor.

14. An oven adapted for use for producing various types of bread crumbs from dough sheets having different thicknesses and physical characteristics, said oven having at least radio frequency induction baking capability and convection baking capability, said oven having multiple zones extending in a longitudinal direction with a food product transporting conveyor extending through said multiple zones, each of said zones having at least one pair of plenums consisting of a lower plenum beneath said conveyor and an upper plenum adjustably supported above said conveyor and out of contact with the upper surface of the food product being transported on said conveyor, each of said pairs of plenums having the capability of having hot air pass there through with the hot air being directed from said plenums toward said food product, and selected pairs of said plenums also having a radio frequency induction baking capability by having radio frequency induction passing from one of said upper or lower plenums to the other of said upper or lower plenums.

15. The oven of claim 14 wherein said upper plenums are vertically adjustably supported to accommodate various thicknesses of dough sheets passing under said plenums.

16. The oven of claim 15 wherein said upper plenums rise in the vertical direction as in the direction of conveyor movement to accommodate increasing thickness of the dough sheet as the dough sheet passes through said oven.

* * * * *